(12) United States Patent
Hecht et al.

(10) Patent No.: US 11,615,481 B1
(45) Date of Patent: Mar. 28, 2023

(54) RECEIPT CAPTURE WITH GOAL ENCOURAGEMENT

(71) Applicant: Wells Fargo Bank, N.A., San Francisco, CA (US)

(72) Inventors: Alan W. Hecht, Chanhassen, MN (US); Marria Wairnola Rhodriquez, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 91 days.

(21) Appl. No.: 16/947,253

(22) Filed: Jul. 24, 2020

Related U.S. Application Data

(62) Division of application No. 15/044,491, filed on Feb. 16, 2016, now Pat. No. 10,755,360.

(51) Int. Cl.
   *G06Q 40/00* (2012.01)
   *G06Q 40/12* (2023.01)
   *G06T 11/60* (2006.01)

(52) U.S. Cl.
   CPC .............. *G06Q 40/12* (2013.12); *G06T 11/60* (2013.01)

(58) Field of Classification Search
   CPC ................................. G06Q 40/12; G06T 11/60
   See application file for complete search history.

(56) References Cited

U.S. PATENT DOCUMENTS

| 7,746,510 | B2 | 6/2010 | Pandipati |
| 3,009,334 | A1 | 8/2011 | Pandipati |
| 8,676,689 | B1 | 3/2014 | Whelan |
| 2008/0222687 | A1* | 9/2008 | Edry ................ H04L 51/04 725/105 |
| 2010/0268629 | A1 | 10/2010 | Ross et al. |
| 2010/0280935 | A1* | 11/2010 | Fellowes ................ G06Q 40/00 705/35 |
| 2013/0226702 | A1* | 8/2013 | Burke ................ G06Q 30/0267 705/14.57 |
| 2014/0067712 | A1 | 3/2014 | Prasad et al. |
| 2014/0074675 | A1 | 3/2014 | Calman et al. |
| 2014/0122335 | A1 | 5/2014 | Deshmukh et al. |
| 2015/0032521 | A1 | 1/2015 | Calman et al. |
| 2015/0066687 | A1 | 3/2015 | Blackhurst et al. |

(Continued)

OTHER PUBLICATIONS

Receipts by Wave, Wave Accounting Inc., https://itunes.apple.com/us/app/receipts-by-wave/id619867797?Is=1&mt=8, © 2013, Wave Accounting Inc., 3 pages.

(Continued)

*Primary Examiner* — Peter Ludwig
*Assistant Examiner* — Reva R Moore
(74) *Attorney, Agent, or Firm* — Merchant & Gould P.C.

(57) ABSTRACT

A method for encouraging saving towards a financial goal for an individual includes receiving on an electronic computing device one or more personal media elements from the individual. A receipt from a purchase by the individual is received. The receipt includes information relating to the purchase made by the individual. Information from the receipt relative to the financial goal is analyzed. At least one of the one or more personal media elements is selected for presentation with the receipt. The at least one of the one or more personal media elements selected is related to an effect of the purchase on achieving the financial goal.

14 Claims, 5 Drawing Sheets

(56) References Cited

U.S. PATENT DOCUMENTS

| | | | | |
|---|---|---|---|---|
| 2015/0100880 A1* | 4/2015 | Matas | ............... | G06F 3/04842 |
| | | | | 715/256 |
| 2015/0220249 A1* | 8/2015 | Snibbe | ................ | H04L 67/10 |
| | | | | 715/719 |
| 2016/0034932 A1* | 2/2016 | Sion | ................ | G06Q 30/0218 |
| | | | | 705/14.1 |

OTHER PUBLICATIONS

Mint: Money Manager, Budget & Personal Finance, Mint.com, https://itunes.apple.com/us/app/mint-money-manager-budget/id300238550?mt=8, © 2008-2015, Mint Software, Inc., 4 pages.

\* cited by examiner

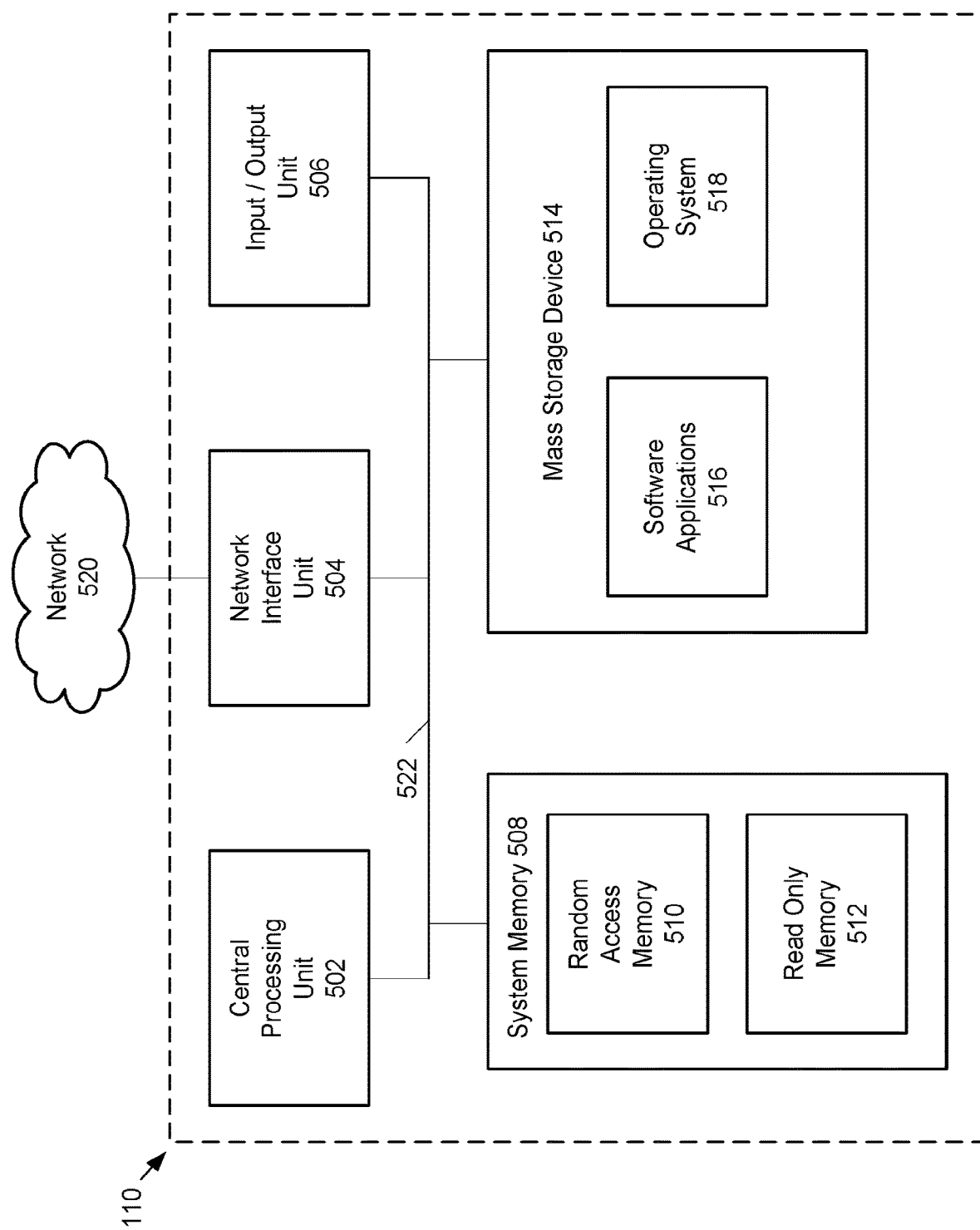

RECEIPT CAPTURE WITH GOAL ENCOURAGEMENT

BACKGROUND

Mobile electronic computing devices such as smart phones have become very common in our society. Devices such as smart phones not only facilitate telephone conversations but also permit a user to surf the Internet and to send and receive information between other electronic computing devices.

Because smart phones are typically carried by the user on a daily basis, the smart phones can be used for a variety of functions. For example, merchandise can be paid for at retail stores using smart phones, smart phones can be used to takes photos and videos of people and objects and smart phones can be used to compare prices of merchandise at one retail store with prices at other retail stores. Many other uses of smart phones are possible.

SUMMARY

Embodiments of the disclosure are directed to a method implemented on an electronic computing device for encouraging saving towards a financial goal for an individual, the method comprising: on the electronic computing device, receiving one or more personal media elements from the individual; receiving a receipt from a purchase by the individual, the receipt including information relating to the purchase made by the individual; analyzing information from the receipt relative to the financial goal; and selecting at least one of the one or more personal media elements for presentation with the receipt, wherein the at least one of the one or more personal media elements selected is related to an effect of the purchase on achieving the financial goal.

In another aspect, a method implemented on an augmented reality electronic device for encouraging saving toward a financial goal for an individual comprises: on the augmented reality electronic device, receiving an image of a receipt for a purchase made by the individual; sending the image of the receipt to a server computer; receiving a personal media element from the server computer relating to the financial goal; and displaying the personal media element on a display screen of the augmented reality electronic device, the personal media element corresponding to an effect of the purchase on achieving the financial goal.

In yet another aspect, an electronic computing device includes a processing unit; and system memory, the system memory including instructions which, when executed by the processing unit, cause the electronic computing device to: receive one or more personal media elements from an individual; receive an image of a receipt from a purchase by the individual; analyze information from the receipt relative to a financial goal of the individual; use the information from the receipt to determine an effect of the purchase on the financial goal; identify at least one of the one or more personal media elements that can be presented as a function of the effect of the purchase on achieving the financial goal, comprising: when a determination is made that the effect of the purchase is consistent with the individual reaching the financial goal, identify at least one of the one or more personal media elements that conveys a message or an image that indicates encouragement to the individual; and when a determination is made that the effect of the purchase exceeds one or more budget categories for the individual, identify at least one of the one or more personal media elements that conveys a message or an image that indicates disapproval of the purchase; and select for presentation on a second electronic computing device the identified at least one of the one or more personal media elements.

The details of one or more techniques are set forth in the accompanying drawings and the description below. Other features, objects, and advantages of these techniques will be apparent from the description, drawings, and claims.

DESCRIPTION OF THE DRAWINGS

FIG. 5 shows example physical components of the server computer of FIG. 1.

DETAILED DESCRIPTION

Figure 1:
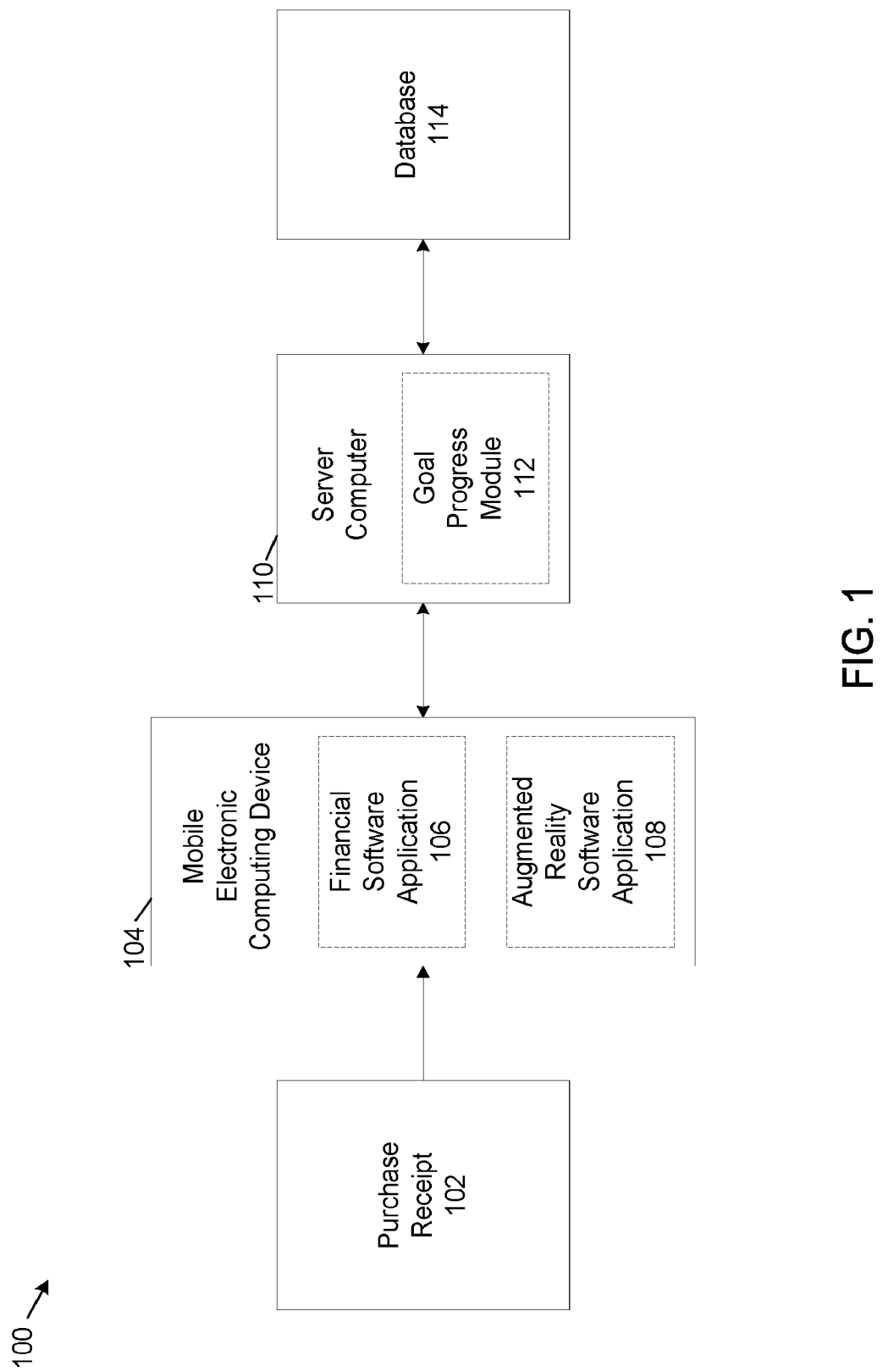
FIG. 1 shows an example system that supports receipt capture with goal encouragement.

The present disclosure is directed to systems and methods that permit an organization such as a financial institution to analyze receipts of customer purchases, determine whether the purchases are consistent with financial goals established for the customer and provide feedback to the customer as to whether the purchases are consistent with making progress towards the financial goals.

The receipts can be obtained from various sources, such as via a camera on a handheld computing device of the customer or as an electronic receipt that can be emailed to the customer. When a physical receipt is obtained, an image of the receipt can be sent to an electronic computing device, for example a server computer, at the financial institution. When an electronic receipt is obtained, the electronic receipt can also be sent to the server computer. The financial institution can send the feedback to the customer's handheld computing device.

The feedback can comprise one or more personal media elements such as messages, images, audio clips, video clips and audio/video clips. The customer can send the personal medial element to the financial institution and the financial institution can determine which personal element to use as feedback as a function of an effect of the purchase on achieving the financial goal. For example, when a purchase is within the customer's budget and consistent with a savings goal for the customer, the feedback can comprise an image that displays encouragement, such as an image of a person giving a thumbs-up gesture. As another example, when a purchase exceeds the customer's budget, the feedback can comprise an image that displays disappointment or admonishment, such as a frown, or an image of a scolding gesture. Other personal media elements and other types of feedback are possible.

The handheld computing device, such as a smart phone, can include an augmented reality (AR) software application. The AR software application can permit the personal media element to be displayed as on overlay on the smart phone. For example, when the smart phone is displaying an image of a receipt from a purchase, an image that displays encouragement or a negative sentiment can be projected as an overlay of the receipt on the smart phone.

In some implementations, an AR electronic device can be used in lieu of a smart phone. The AR electronic device can be a headset that can be worn by the customer. The headset includes a wearable computer, a camera and an optical display. The wearable computer includes a wireless telecommunication capability, permitting a wireless connection between the wearable computer and one or more server computers. The optical display reflects projected images and also permits the user to see through the display. When the AR electronic device is used, the personal media element can be projected on the optical display of the AR electronic device.

In some implementations, a software application on a server computer at the financial institution can analyze personal media elements of the customer and automatically identify a sentiment associated with one or more of the personal media elements. For example, the software application can mine personal media elements from the customer's smart phone and/or from social media pictures or videos. The software application can also automatically attach a message to a particular personal media element based on the sentiment associated with the personal media element. The personal media element can include images of family members. For example, a picture of the customer's mother obtained from social media can be superimposed with a cautionary message when the customer makes a frivolous purchase. As another example, a picture of the customer's child can be superimposed with an encouraging message such as "good job daddy" when based on a purchase receipt a determination is made that the customer is on track to meeting a financial goal, for example saving for a family vacation. Other examples are possible.

In this disclosure, the systems and methods are described with respect to a financial organization, although the systems and methods can also apply to other types of organizations for which members of the organization have personal goals. As an example, a member of a health club can have personal goals such as running a certain number of miles per week or lifting a certain amount of weight per week. Feedback in the form of personal media elements can be displayed on the member's handheld computing device when information regarding the member's performance is processed at a server computer at the health club. As another example, employees of non-financial organizations can have personal goals such as reaching certain milestones on projects. Feedback in the form of personal media elements can be displayed on the employee's handheld computing device based on progress towards the milestones. Examples from other types of organizations are possible.

The systems and methods disclosed herein are directed to a computer technology that can provide instant, automatic feedback to a customer making a retail transaction. In addition, the feedback can be personalized to motivate the customer to stay on track towards savings for a financial goal. Furthermore, the feedback can include more than a simple message, but can also include images, audio clips and audio/visual clips that can provide an additional level of motivation for the customer.

FIG. 1 shows an example system 100 that supports receipt capture with goal encouragement. The example system 100 includes a purchase receipt 102, a mobile electronic computing device 104, a server computer 110 and a database 114. For system 100, the mobile electronic computing device 104 is a smart phone, having an augmented reality software application. Other customer electronic computing devices, such as an AR headset can be used. The mobile electronic computing device 104 includes a financial software application 106 and an augmented reality software application 108. The server computer includes a goal progress module 112. System 100 can also include more, fewer or other components.

The example purchase receipt 102 is a receipt obtained as a result of purchasing a product or a service. The customer can take a picture of the purchase receipt 102 using a camera on the customer's smart phone and send the picture to server computer 110. In some implementations, the purchase receipt 102 is a paper receipt. In other implementations, the purchase receipt 102 is an electronic receipt.

The example mobile electronic computing device 104 is a mobile personal electronic computing device of the customer. The customer can use the mobile electronic computing device 104 to photograph the purchase receipt 102. The customer can also use global positioning system (GPS) software on the mobile electronic computing device 104 to obtain a current location of the customer. For system 100, the mobile electronic computing device 104 is a smart phone of the customer. In other implementations, the mobile electronic computing device 104 is an AR headset. Other mobile electronic computing devices can be used. In this disclosure, the mobile electronic computing device 104 is referred to as the smart phone.

The example financial software application 106 is a mobile financial software application from the financial institution. The customer can use the financial software application 106 to conduct mobile banking transactions, such as making deposits and withdrawals and checking account balances. The financial software application 106 can also include functionality to permit the customer to photograph the purchase receipt 102 and send an image of the purchase receipt 102 to the financial institution.

The example augmented reality software application 108 is a software application that permits the smart phone to have augmented reality functionality. The augmented reality functionality can permit an image of the personal media element to be overlaid on the display screen of the smart phone or projected on the display screen of the AR headset device. The augmented reality software application 108 can also include security functionality, including biometric capability such as facial recognition, voice recognition, retinal scan and other biometric capability.

The example server computer 110 is a server computer of the financial institution. The customer can login to server computer 110 using the financial software application 106 on the customer's smart phone. More than one server computer 110 can be used.

The example goal progress module 112 processes purchase receipts sent to server computer 110 from the smart phone. The goal progress module 112 also can determine from the purchase receipt whether a purchase transaction corresponding to the receipt is consistent with reaching a financial goal established for the customer. The goal progress module 112 also can obtain and categorize personal media elements for the customer, associate a personal media element with an effect of a purchase transaction relative to achieving the financial goal, and send the personal media element to the smart phone for display to the customer. The goal progress module 112 is discussed in more detail later herein.

The example database 114 can store personal and financial records for the customer and can also store personal media elements for the customer. The database 114 can be accessed from server computer 110.

Figure 2:
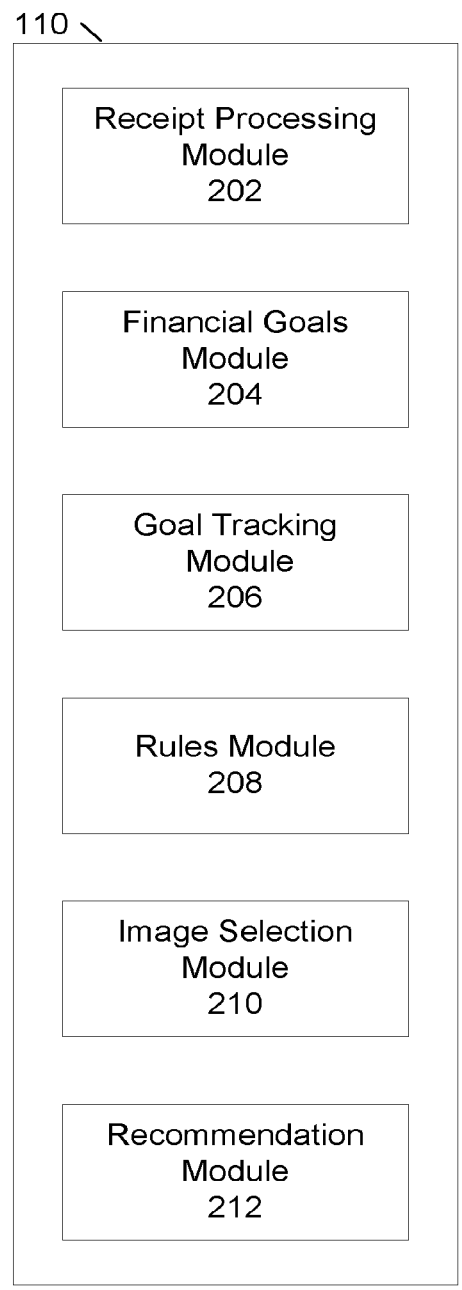
FIG. 2 shows example modules of the goal progress module of FIG. 1.

FIG. 2 shows example modules of the goal progress module 112. The example goal progress module 112 includes a receipt processing module 202, a financial goals module 204, a goal tracking module 206, a rules module 208, an image selection module 210 and a recommendation module 212. More, fewer or different modules can be used.

The example receipt processing module 202 processes receipts of purchases made by the customer. The receipt processing module 202 can receive an image of each receipt from the financial software application 106 on the mobile electronic computing device 104. The receipt processing module 202 can parse each receipt and extract information from the receipt such as an amount of the purchase, a name of the product being purchased, a name of the retail store at which the purchase was made and other information. In some implementations, the receipt processing module 202 can use the information obtained from multiple receipts to set or suggest financial goals for the user.

The example financial goals module 204 processes financial goals for the customer. In some implementations, the customer can establish the financial goals by logging onto server computer 110 and entering or selecting the financial goals, by communicating the financial goals to an employee of the financial institution or by other means. In addition, as discussed above, the receipt processing module 202 can suggest financial goals for the customer based on an analysis of one or more purchase receipts. Some example financial goals can include saving for a vacation, saving for an automobile, keeping coffee expenditures within a budget and staying within a budget for other spending categories. Other financial goals are possible.

The example goal tracking module 206 uses information obtained from the analysis of the purchase receipts to determine whether the customer is on track to reach a financial goal. For example, if the customer has a financial goal of saving for a vacation and the receipt indicates that customer has made a purchase that exceeds a budgeted amount, the goal tracking module 206 can determine that the customer is not on track to reach the financial goal.

The goal tracking module 206 can also keep track of savings goals. For example, if the customer has a financial goal of savings a certain amount of money per month, the goal tracking module 206 can determine when the customer reaches or does not reach the savings goal.

The example rules module 208 contains one or more rules that can determine when to trigger a response to the customer based on progress towards a financial goal. The rules can be suggested by the customer, for example via a discussion with a personal banker, via a rules configuration screen on the financial software application 106, via a rules configuration screen accessed by logging in to server computer 110 via another user device such a desktop computer or via other means. Example rules can include sending a personal media element showing encouragement to the smart phone when a purchase receipt indicates that the customer is on track for a financial goal and sending a personal media element showing admonishment to the smart phone when the purchase receipt indicates that the customer has made a frivolous purchase or a purchase that exceeded a budget.

The rules can also be personalized to send a particular personal media element for a specific financial goal. For example, for a showing of encouragement for a financial goal of saving for a vacation, a personal media element showing a child of the customer saying "good job daddy" or a message of a similar tone can be sent to the smart phone when the user makes a deposit in a vacation fund. As another example, when the customer makes a purchase that exceeds a budgeted category, a personal media element showing the customer's mother admonishing the customer can be sent to the smart phone.

The rules can also be personalized based on geo-fencing. For example, the customer's children can attach a message to a Christmas list for a specific gift. When the customer is within a threshold distance of a retail store that sells the gift, for example a toy store, the rules module 208 can trigger a personal media element that can be a reminder to the user. For example, the personal media element can be a video of the customer's daughter saying "remember that doll I wanted?" Other rules that can trigger a personal media element are possible.

The example image selection module 210 is used in conjunction with the rules module 208 to determine which personal media element is to be sent to the customer's smart phone each time a rule is triggered. In some cases the personal media element to be sent is selected by the customer based on purchase or savings effect on a specific financial goal. In other cases, the image selection module 210 can mine the customer's smart phone and/or social media, automatically identify a sentiment for a picture and/or video and assign the picture and/or video as a personal media element to be sent to the smart phone when the sentiment is appropriate based on the purchase or savings effect on the specific financial goal.

The example recommendation module 212 can analyze customer purchasing information (obtained from receipts and other sources) and customer savings history and make recommendations to the customer that can help the customer reach financial goals. For example, when a determination is made that customer expenditures are consistently exceeding one or more budget categories, the recommendation module 212 can suggest ways in which the customer can save money. For example, the recommendation module 212 can recommend purchasing fewer coffee drinks each month to help save towards a financial goal. The recommendation module 212 can also send messages to the customer reminding the customer that the customer is exceeding the customer's budget for one or more categories. Other types of recommendations are possible.

Figure 3:
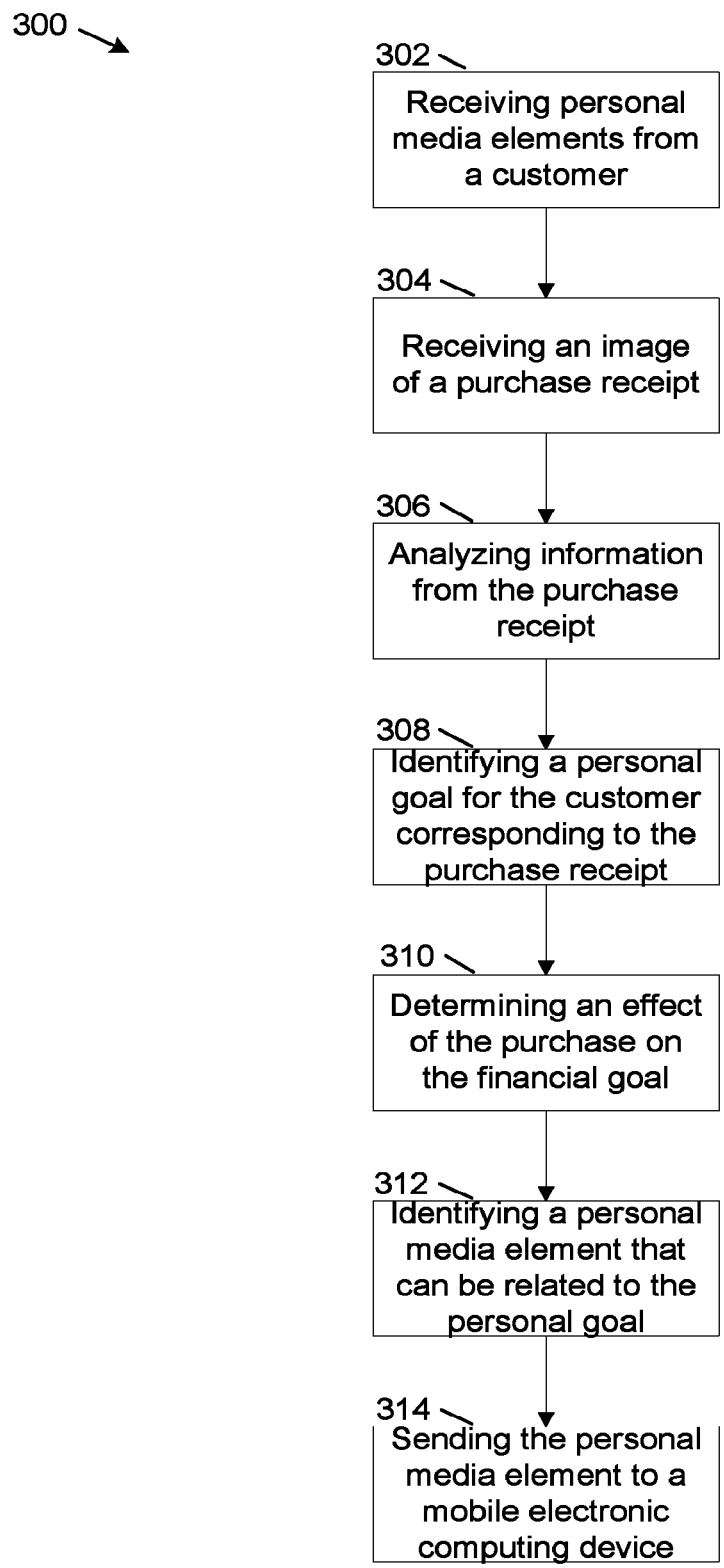
FIG. 3 shows a flowchart of an example method implemented on a server computer for providing goal feedback based on a receipt capture.

FIG. 3 shows a flowchart of an example method 300 implemented on a server computer, for example on server computer 110, for providing goal feedback based on a receipt capture. The goal feedback can have a positive effect, such as an encouraging message and/or image or the goal feedback can have a negative effect, such as a critical message and/or image.

At operation 302, personal media elements are received from a customer. The personal media elements can comprise one or more of photographs, audio clips, video clips and audio/video clips. The personal media elements can represent a range of sentiments such as joy, happiness, disappointment and admonishment. The customer can send the personal media elements to the server computer from a mobile electronic computing device, such as a smart phone or from another electronic computing device such as a desktop computer.

The server computer can also access generic media elements from a database, for example from database 114 or from another server computer. For example, a generic media element can comprise an image of a teacher (not known to the customer) scolding one of the teacher's students.

At operation 304, an image of a purchase receipt is received at the server computer. The purchase receipt is a receipt for a purchase made by the customer. The customer can capture the image of the purchase receipt using a camera on the customer's smart phone. In some implementations the smart phone can contain a button or icon that when clicked permits the customer to photograph the purchase receipt and automatically send an image of the purchase receipt to the server computer.

At operation 306, the goal progress module 112 analyzes information from the purchase receipt. The information can include the amount of the purchase, the item of items purchased, a name of a retail store where the purchase occurred, the date of the purchase and other information.

At operation 308, the goal progress module 112 identifies a financial goal for the customer corresponding to the purchase receipt. The goal progress module can identify the financial goal for the customer by using the information from the purchase receipt, using the information from other purchase receipts for the customer and using personal information for the customer including financial goals established by the customer.

At operation 310, the goal progress module 112 determines an effect of the purchase on the financial goal. The goal progress module 112 can determine whether the purchase helps to advance the customer towards achieving the financial goal or whether the purchase represents a setback to the customer regarding achieving the financial goal. For example, if the customer has established a financial goal for saving for an automobile and the customer has a monthly budget established for various expense categories, when the goal progress module 112 determines that the customer has exceeded a threshold for a budget category corresponding to the purchase, the goal progress module 112 can determine that the customer is not advancing towards achieving the financial goal.

At operation 312, a personal media element is identified that can be related to the financial goal. For example, when a determination is made that the user is on track to meeting the financial goal, a positive personal media element can be selected, such as an image or a video or a recording of a happy and excited child. Conversely, when the determination is made that the user is not on track to meeting the financial goal, a negative personal media element can be selected, such as an image, a video clip or an audio clip of a sad and disappointed child. Other personal media elements are possible.

At operation 314, the personal media element is transmitted to the mobile electronic computing device 104, for example to the smart phone. For method 300, the smart phone has an augmented reality (AR) software application installed. The AR software application permits the personal medial element to be projected as an overlay on the smart phone. For example, if the smart phone is displaying an image of the purchase receipt, the personal medial element can appear as a projected overlay to the purchase receipt.

Figure 4:
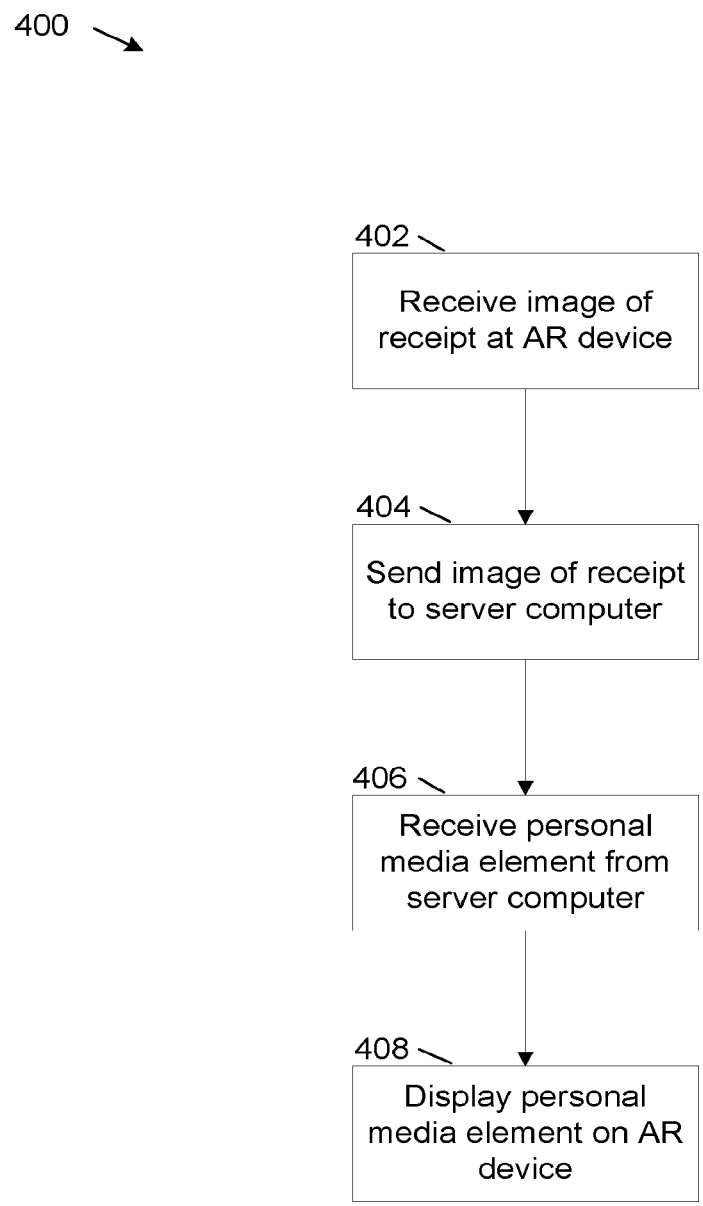
FIG. 4 shows a flowchart of an example method implemented on an augmented reality electronic device for providing goal feedback based on a receipt capture.

FIG. 4 shows a flowchart of an example method 400 implemented on an AR device, for example on the smart phone, for displaying a personal media element as customer feedback related to customer progress towards a financial goal.

At operation 402, an image of a receipt is received at the AR device. The receipt is a receipt for a purchase made by the customer. The image of the receipt is obtained by photographing the receipt using a camera on the AR device.

At operation 404, the image of the receipt is sent to a server computer, for example to server computer 110.

At operation 406, a personal media element is received from the server computer. The personal media element corresponds to a personal media element selected by the goal progress module 112 at operation 312 of FIG. 3.

At operation 408, the personal medial element is projected on the display screen of the AR device.

As illustrated in the example of FIG. 5, server computer 110 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the server computer 110, such as during startup, is stored in the ROM 512. The server computer 110 further includes a mass storage device 514. The mass storage device 514 is able to store software instructions and data. Some or all of the components of the server computer 110 can also be included in mobile electronic computing device 104.

The mass storage device 514 is connected to the CPU 502 through a mass storage controller (not shown) connected to the system bus 522. The mass storage device 514 and its associated computer-readable data storage media provide non-volatile, non-transitory storage for the server computer 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 110.

According to various embodiments of the invention, the server computer 110 may operate in a networked environment using logical connections to remote network devices through the network 520, such as a wireless network, the Internet, or another type of network. The server computer 110 may connect to the network 520 through a network interface unit 504 connected to the system bus 522. It should be appreciated that the network interface unit 704 may also be utilized to connect to other types of networks and remote computing systems. The server computer 110 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the server computer 110 can store software instructions and data. The software instructions include an operating system 518 suitable for controlling the operation of the server computer 110. The mass storage device 514 and/or the RAM 510 also store software instructions, that when executed by the CPU 502, cause the server computer 110 to provide the functionality of the server computer 110 discussed in this document. For example, the mass storage device 514 and/or the RAM 510 can store software instructions that, when executed by the CPU 502, cause the server computer 110 to display received data on the display screen of the server computer 110.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an augmented reality electronic device for encouraging saving toward a financial goal for an individual, the method comprising:
   on the augmented reality electronic device, receiving an image of a receipt for a purchase made by the individual;
   sending the image of the receipt to a server computer;
   receiving a personal media element from the server computer relating to the financial goal, wherein the personal media element is a personal image known to the individual, the personal image being selected to convey a given sentiment; and
   displaying the personal media element on a display screen of the augmented reality electronic device, the personal media element corresponding to an effect of the purchase on achieving the financial goal, wherein the personal media element is displayed as an overlay, in augmented reality, of the receipt on the display screen of the augmented reality electronic device.

2. The method of claim 1, wherein when the purchase has a positive effect on helping the customer reach the financial goal, the personal media element conveys encouragement.

3. The method of claim 1, wherein, when the purchase has a negative impact on the individual reaching the financial goal, the personal media element conveys a negative connotation.

4. The method of claim 1, wherein the personal media element comprises one of a video clip, an audio clip or an audio/video clip.

5. The method of claim 1, further comprising:
   using global positioning system (GPS) software on the augmented reality electronic device to send a current location of the individual to the server computer; and
   when the individual is located within a threshold distance of a store in which the individual can make the purchase, displaying the personal media element that comprises a reminder to the individual that the individual can make the purchase.

6. The method of claim 1, further comprising analyzing the personal media elements to identify a sentiment associated with the personal media element.

7. The method of claim 6, further comprising attaching a message to a personal media element corresponding to the sentiment associated with the personal media element.

8. The method of claim 1, further comprising analyzing past purchases of the individual to determine opportunities for saving in future purchases.

9. The method of claim 1, further comprising receiving a current location of the individual.

10. The method of claim 9, wherein the personal media element includes a reminder to purchase a gift for a family member.

11. The method of claim 1, further comprising examining a smart phone of the user to obtain additional personal media elements.

12. The method of claim 11, further comprising identifying a sentiment from the additional personal media elements from the smart phone.

13. The method of claim 1, further comprising obtaining additional personal media elements from one or more social media websites associated with the individual.

14. An augmented reality electronic device for encouraging saving toward a financial goal for an individual, the augmented reality electronic device comprising:
   a processing unit; and
   system memory, the system memory including instructions which, when executed by the processing unit, cause the augmented reality electronic device to:
     receive one or more personal media elements from an individual;
     receive an image of a receipt from a purchase by the individual;
     analyze information from the receipt relative to a financial goal of the individual;
     use the information from the receipt to determine an effect of the purchase on the financial goal;
     identify at least one of the one or more personal media elements that can be presented as a function of the effect of the purchase on achieving the financial goal, comprising:
       when a determination is made that the effect of the purchase is consistent with the individual reaching the financial goal, identify at least one of the one or more personal media elements that convey encouragement to the individual; and
       when a determination is made that the effect of the purchase exceeds one or more budget categories for the individual, identify at least one of the one or more personal media elements that conveys a negative connotation to the individual;
     wherein the at least one of the personal media elements is a personal image known to the individual, the personal image being selected to convey the encouragement or the negative connotation; and
   select for presentation on a second electronic computing device the identified at least one of the one or more personal media elements as an overlay, in augmented reality, of the receipt on the second electronic computing device.

* * * * *